United States Patent [19]

Aboul-Nasr

[11] Patent Number: 5,069,750
[45] Date of Patent: Dec. 3, 1991

[54] DISTRIBUTOR FOR A DEVOLATILIZER

[75] Inventor: Osman T. Aboul-Nasr, Leominster, Mass.

[73] Assignee: Polysar Financial Services S.A., Fribourg, Switzerland

[21] Appl. No.: 507,734

[22] Filed: Apr. 12, 1990

[51] Int. Cl.$^5$ .............................................. B01D 1/22
[52] U.S. Cl. .................. 159/2.001; 159/13.1; 159/43.1; 159/49; 159/DIG. 10; 159/DIG. 16; 264/102; 425/203; 528/501
[58] Field of Search ...................... 159/43.1, 47.1, 49, 159/DIG. 10, 2.1, DIG. 16, 13.1, 27.4, 13.3; 264/102, 101, DIG. 78; 425/203; 528/501

[56] References Cited

U.S. PATENT DOCUMENTS

| | | | |
|---|---|---|---|
| 1,933,960 | 11/1933 | Brabaek | 159/43.1 |
| 2,146,532 | 2/1939 | Crane et al. | 264/102 |
| 2,343,666 | 3/1944 | Hickman et al. | 159/DIG. 6 |
| 2,713,895 | 7/1955 | Eckstrom | 159/43.1 |
| 3,149,056 | 9/1964 | Longstreth et al. | 159/43.1 |
| 3,269,451 | 8/1966 | Mehlo et al. | 159/DIG. 6 |
| 3,410,938 | 11/1968 | Schippers | 425/203 |
| 3,694,535 | 9/1972 | Kimoto et al. | 159/DIG. 6 |
| 4,413,968 | 11/1983 | Bliss | 264/150 |
| 4,744,957 | 5/1988 | Imai et al. | 159/DIG. 10 |
| 4,747,915 | 5/1988 | Pagani | 159/DIG. 10 |
| 4,764,254 | 8/1988 | Rosenblad | 159/43.1 |
| 4,786,363 | 11/1988 | Elmore et al. | 159/43.1 |
| 4,932,468 | 6/1990 | Ayub | 159/43.1 |

FOREIGN PATENT DOCUMENTS

| | | | |
|---|---|---|---|
| 1583497 | 10/1969 | France | 159/43.1 |
| 0511485 | 8/1939 | United Kingdom | 159/43.1 |

*Primary Examiner*—Virginia Manoharan
*Attorney, Agent, or Firm*—Stevens, Davis, Miller & Mosher

[57] ABSTRACT

A distributor for a falling strand devolatilizer which is a closed top upwardly facing projection having one or more inclined faces and being centered on a tray having strand forming holes there through. The distributor holds polymer melt in a devolatilizer for a longer period of time resulting in lower levels of monomer, oligomer, and diluent in the treated polymer.

12 Claims, 1 Drawing Sheet

DISTRIBUTOR FOR A DEVOLATILIZER

FIELD OF THE INVENTION

The present invention relates to distributors for the polymer melt in a falling strand devolatilizer, and a process of using such a distributor.

BACKGROUND OF THE INVENTION

In the bulk or solution polymerization of one or more monomers, it is generally necessary to remove unreacted monomer, dimers, trimers, oligomers, and diluent, if present, from the resulting polymers. In one method the polymer melt, from the reactor is pumped by a gear pump to a heater on top of a vertical vacuum chamber. The heater is typically a tube and shell type heat exchanger, and the tubes open into the top of the vacuum chamber. The polymer melt flows through the tubes of the heat exchanger and should form strands of melted polymer descending to the bottom of the vacuum chamber. The residual monomer, dimers, trimers, oligomers, and diluent if present devolatilize out of the falling polymer strands, causing them to foam.

The preheater and devolatilizer are operated hot to reduce the viscosity of the melt. This should permit the bubbles of volatile material in the melt to rise to the surface of the melt more rapidly. While this is true, the less viscous melt descends to the bottom of the devolatilizer faster and there is less time for the volatiles in the melt to diffuse to the surface of a strand of polymer melt. There has been a need to increase the dwell time of the polymer melt in a form which provides a high surface to volume ratio.

One early attempt to achieve this was to provide projections, or cones (the so called chinese hats). In theory the falling strands of polymer melt impacted on the surface of the cone; ran down the side of the cone, then continued to the bottom of the devolatilizer as an annulus of melted polymer. In practice, the polymer melt does not always have a uniform viscosity so that "blobs" of polymer may fall out of the annulus of melted polymer. The result is that the devolatilization is less efficient than expected, and there is a high standard deviation in the devolatilization of the polymer.

U.S. Pat. No. 3,694,535 issued Sept. 26, 1972 discloses an annular distributor to be used in a falling strand devolatilizer. The distributor of U.S. Pat. No. 3,694,535 is of an open top type, rather than close top as required by the present case. Furthermore, the distributor does not suggest a tray as required in the present case.

U.S. Pat. No. 4,744,957 issued May 17, 1988 may be of interest. It discloses a devolatilizer with a head which extrudes polymer film. The patent fails to teach the projection and tray required in the present case.

Applicants co-pending U.S. patent application Ser. No. 507,740 filed on even date herewith discloses a horizontal polymer melt distributor. The distributor comprises in combination a "candy scoop" shaped distributor and a tray beneath the distributor. The co-pending patent application fails to teach the projection of the present invention. Furthermore the "candy scoop" distributor uses a significantly different preheater exit than in a conventional falling strand devolatilizer.

The present invention overcomes the drawbacks of the prior art and provides a novel distributor which helps reduce the content of monomer, dimer, trimer, oligomer and diluent, if present, in a polymer melt from a reactor. Additionally, the present invention provides a polymer melt distributor which results in a lower standard deviation in the residual levels of monomer, dimer, trimer, and diluent in devolatilized polymer.

SUMMARY OF THE INVENTION

The present invention provides in a falling strand devolatilizer a distributor comprising in cooperating arrangement:

(i) an upwardly tapering closed top projection, centrally located below the polymer melt inlet to said devolatilizer said projection having one or more smooth inclined faces; and (ii) a tray having a dimension greater than the base of said projection, and less than the diameter of the interior of the devolatilizer at the location where it is used said tray projecting substantially uniformally around said base of said projection, and comprising a base having a number of strand forming holes therethrough, said holes being of a dimension to form continuous strands of polymer melt, the dimension of said holes being of a dimension to form continuous strands of polymer melt, the dimension of said holes increasing toward the perimeter of said base; and a shallow weir extending around the perimeter of said tray.

BRIEF DESCRIPTION OF THE DRAWINGS

In FIGS. 1 and 2 like numbers designate like parts.

DETAILED DESCRIPTION

Figure 1:
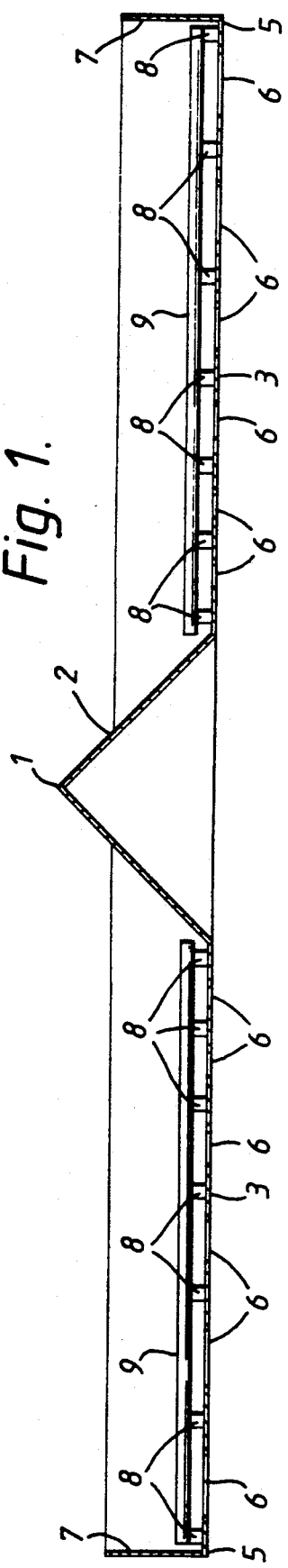
FIGS. 1 and 2 are cross sectional views of distributions in accordance with the present invention.
Figure 2:
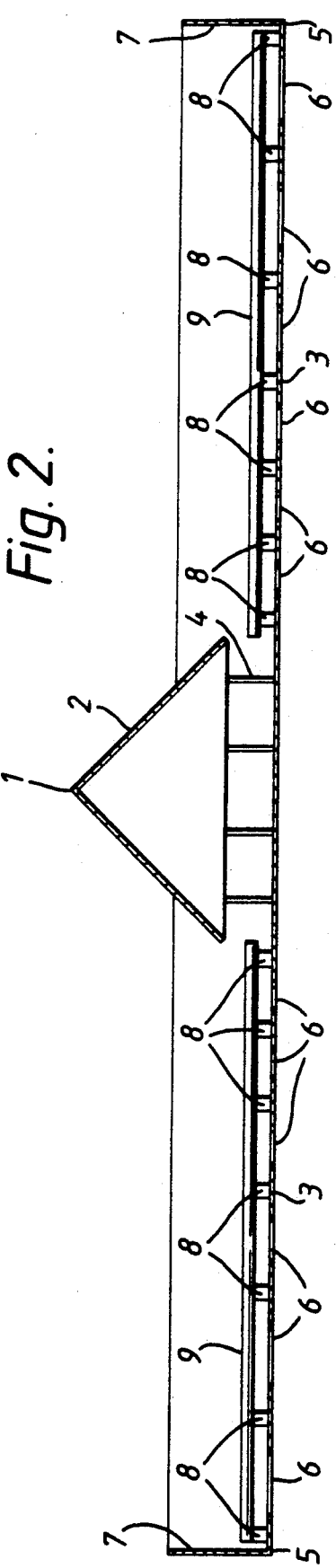

The upwardly tapering projection 1 in accordance with the present invention has one or more smooth inclined faces 2. The projection may be a cone, or a truncated cone both of which have a single inclined smooth face. The upwardly tapering projection may have several distinct faces. It may have the shape of an n sided upwardly facing polyhedron where n is an integer greater than 2. For example, the upwardly facing polyhedron where n is an integer greater than 2. For example, the upwardly tapering projection could be a pyramid, or any other multi-faced upwardly tapering projection, such as a dodecahedron. In a devolatilizer where there are size limitations the upwardly tapering projection may be assembled in pieces (e.g. faces). Thus, the projection could be disassembled then passed through a manhole a piece at a time to be reassembled on or above the tray.

The upwardly tapering projection need not be solid. It should have a closed end (e.g. not annular in shape). However, the projection may contain one or more passages or channels which are parallel to its longitudinal (vertical) axis. These channels permit the polymer melt to flow through the projection as well as down the smooth inclined outer surface of the projection.

The upwardly tapering projection in accordance with the present invention may be seated on the tray 3 or spaced above the tray. Preferably the projection is centered over the center of the tray. If the projection is spaced above the tray it may be held in position by a rod or base 4 extending upwardly from the tray. The edge of the tray 5 should extend radially outward beyond the base of the upwardly tapering projection. Generally, the configuration (e.g. shape) of the tray will be the same as that of the base of the upwardly tapering projection.

The tray comprises a base through which a series of strands forming holes 6 have been made. The diameter of the strand forming holes should be such that the polymer melt forms strands rather than blobs. Additionally, the diameter of the strand forming holes should increase the farther the hole is from the center of the tray. This increase in hole size is to prevent "dead" spots on the tray. The polymer melt will not stay in one place long enough for the polymer to degrade or char. Typically the hole size will range from about ½ an inch (1 cm) preferably about ¾ of an inch about (2 cm) to about 1.5 inches (about 3.5 cm) preferably about 1.25 inches (about 3 cm) preferably about 1.25 inches (about 3 cm) near the edge of the tray.

At the perimeter of the tray is an upward extending weir or lip or rim 7. This tends to hold the polymer melt in the tray to cause more efficient devolatilization.

In accordance with the present invention, the projection and/or the tray may optionally be heated. If the tray is heated it will generally contain spacers 8 on the top of the tray on which heating elements 9 rest. The projection may be heated by having an internal heating coil. The heater means may be an electric resistance heater or a hot oil heater. If both the projection and the tray are heated, the heating means will generally be common. Even if the heating means is present, it will typically be used only during start up and shut down to bring the distributor up to temperature and ensure polymer melt drains from the tray at shut down. The heater may also be used to heat the polymer melt to make up for heat loss due to evaporative cooling as the volatiles come out of the polymer melt.

In practice, the composition leaving the reactor has a monomer conversion of not less than about 70%. The reactants leaving the reactor may contain up to about 30% by weight of monomer, dimer, trimer, oligomers, and diluent if present. The mixture leaving the reactor is pumped, typically by a gear pump, to a preheater. The preheater is typically a shell and tube heat exchanger, with the tubes opening into the top of the devolatilization chamber. The preheater is operated at a temperature up to 260° C., preferably about 210 to 240, most preferably 220° C.–230° C. The devolatilization chamber is operated at a temperature up to about 260° C., preferably from about 210° to 240° C. The distributor in the devolatilizer should be at or near the operating temperature of the devolatilizer. The pressure in a single stage devolatilizer may be from 1 to 50 typically from 5 to 25 mm Hg, in a two-stage devolatilizer the first stage is operated at 20 to 200 mm Hg and the second is operated at 1 to 10 mm Hg and the distributor on the invention is preferably used in the second stage.

The polymer melt leaves the tubes of the heat exchanger in the preheater and begins to descend as strands to the devolatilizer. As the melt leaves the preheater it begins to froth or foam as the volatiles in the melt vaporize and form bubbles which diffuse to the surface of the strands. The strands of polymer melt impact on the projection and flow down its smooth inclined surface. This slows the passage of the melt through the devolatilizer and increases the surfaces area to volume ratio of the melt as it forms a film on the projection. When the melt reaches the base of the project it may fall as an annulus of melt to the tray, if the projection is above the tray, or it may flow out over the tray if the projection is on top of the tray. The melt in the tray continues to froth and devolatilize and then it passes through the strand forming holes and descends as strands to the bottom of the devolatilization chamber.

The time it takes for the polymer melt to descend to the bottom of the devolatilizer, in accordance with the present invention should be not greater than 10, preferably from about 3 to 8 minutes.

The distributor of the present invention has been described in accordance with the manufacture of polystyrene and high impact polystyrene. The distributor may be used in association with other polymers which need to be devolatilized.

The present invention will now be illustrated by the following examples in which unless otherwise specified parts are parts by weight and % is weight %.

EXAMPLE 1

In a commercial plant, using a falling strand devolatilizer, and a conical deflector but no tray, high impact polystyrene leaving the reactor contained 5–8% sytrene monomer. After going through the devolatilizer, the high impact polystyrene had an average residual monomer level of 700 parts per million with a standard deviation of 95 parts per million.

After installation of a tray to produce a distributor of the present invention, at the same rate of operation and operating temperature and pressure for high impact polystyrene the residual monomer level was 500 parts per million and the standard deviation was 65 parts per million.

EXAMPLE 2

In two commercial reactors producing high impact polystyrene, the residual styrene monomer level in the material entering the second stage devolatilizer was 0.5 to 2%. The devolatilizer contained a conical distributor. The residual monomer levels and standard deviations were:

|  | Residual Styrene | Standard Deviation |
| --- | --- | --- |
| Plant 1 | 1400 ppm | 400 |
| Plant 2 | 1100 ppm | 250 |

After installation of a tray below the conical distributor to form a distributor of the present invention and at the same operating rate, temperature and pressure the residual styrene levels, and standard deviations were:

|  | Residual Styrene | Standard Deviation |
| --- | --- | --- |
| Plant 1 | 600 ppm | 90 |
| Plant 2 | 500 ppm | 75 |

The above examples show the distributors of the present invention:
 (i) reduce the level of residual monomer in the polymer and
 (ii) provide a more uniform reproducibility (lower standard deviation)
than the distributors of the prior art.

What is claimed is:

1. In a falling strand devolatilizer a distributor comprising in cooperating arrangement:
 (i) an upwardly tapering closed top projection, centrally located below a polymer melt inlet to said devolatilizer; said projection having at least one inclined face; and (ii) a tray having a dimension greater than the base of said projection, and less than the diameter of the interior of the devolatilizer, said tray projecting substantially uniformally around and extending radially outwardly from said base of said projection, and comprising a base having a number of strand forming holes therethrough, said holes being of a dimension to form continuous strands of polymer melt, the dimension of said holes increasing toward the perimeter of said tray base; and a shallow weir extending around the perimeter of said tray.

2. The distributor according to claim 1 wherein said projection is selected from the group consisting of a cone, a pyramid, and an upward tapering polyhedron.

3. The distributor according to claim 2 wherein said tray has the same shape as the base of said projection.

4. The distributor according to claim 3 wherein said projection is spaced above the center of said tray.

5. The distributor according to claim 4 further comprising means defining passages parallel to the longitudinal axis of said projection, passing through said projection.

6. The distributor according to claim 5 wherein said projection is cone shaped.

7. The distributor according to claim 6 further comprising heating means for at least one of said projection and said tray.

8. The distributor according to claim 1 wherein said projection is cone shaped.

9. The distributor according to claim 8 further comprising heating means for at least one of said projection and said tray.

10. In a method of devolatilizing a polymer melt by passing it through a falling strand devolatilizer at a temperature from 210° to 220° C. and a pressure from 1 to 50 mm of Hg the improvement comprising impacting the polymer melt on the top of an upwardly tapering closed top projection to form an expanding downward flow of polymer, changing the downwardly flow of polymer to horizontal flow in an outwardly expanding direction over the surface of a perforated tray and passing the horizontally flowing polymer through holes of different sizes in said tray to form continuous strands of polymer melt, said strands of polymer melt being larger in cross-section the further the holes are from the downward flow, the residence time on the tray and in the strands is from 3 to 8 minutes.

11. The process according to claim 10 further comprising heating said polymer melt during its downward and horizontal flow.

12. The process according to claim 10 wherein said projection is a cone.

* * * * *